April 14, 1970  A. G. CARTER  3,505,711
FULL-CONTROL SAFETY-BELT BUCKLE
Filed April 15, 1966  5 Sheets-Sheet 5
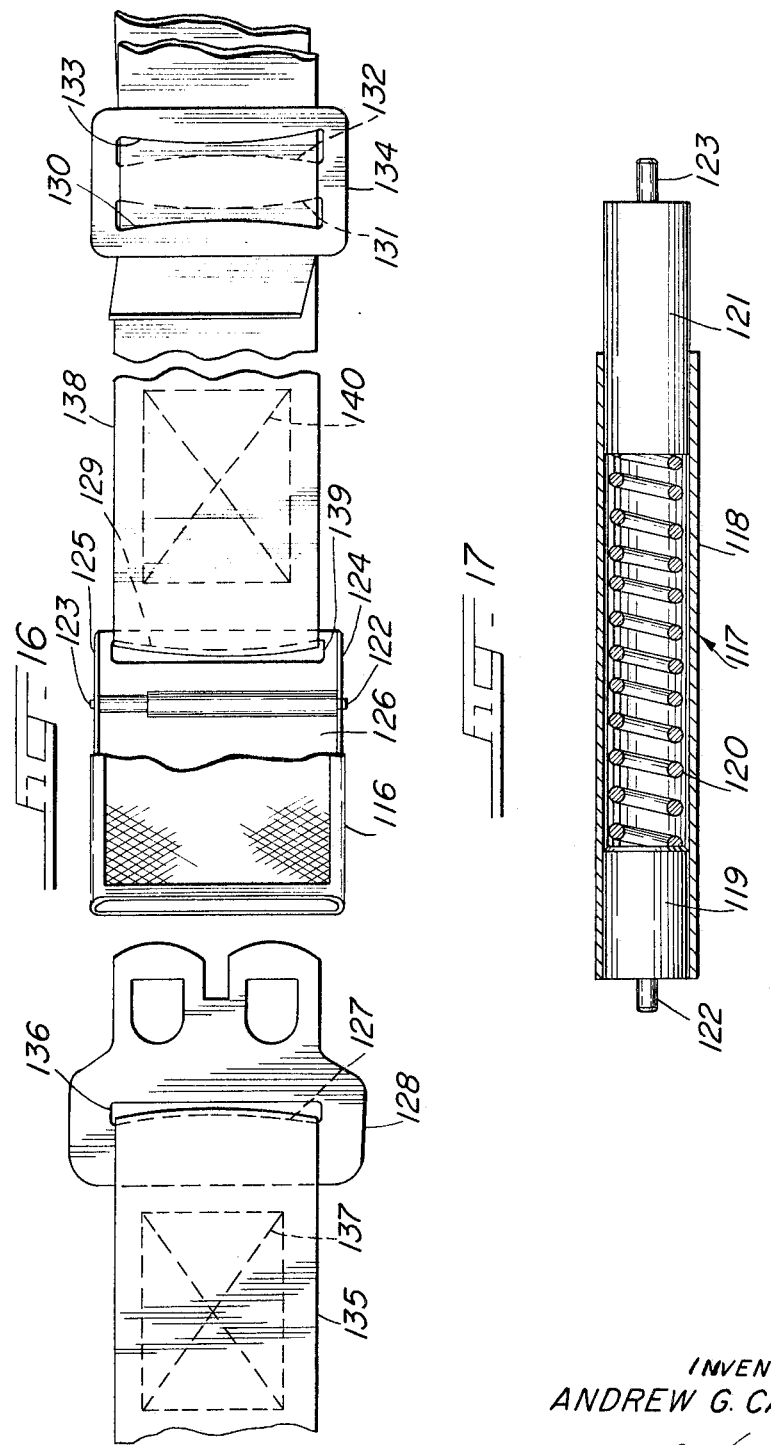
INVENTOR.
ANDREW G. CARTER United States Patent Office 3,505,711
Patented Apr. 14, 1970

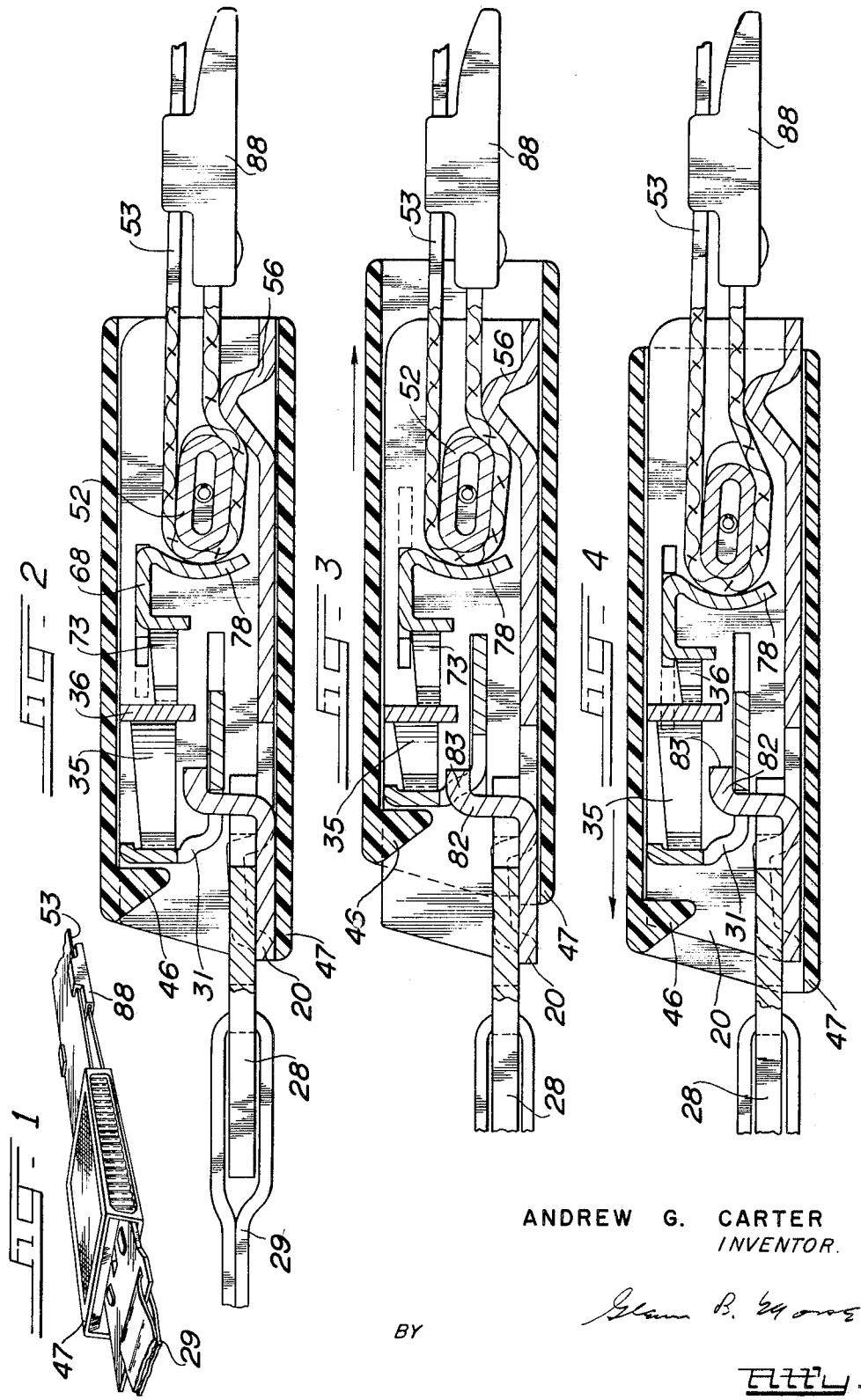
ANDREW G. CARTER
INVENTOR.

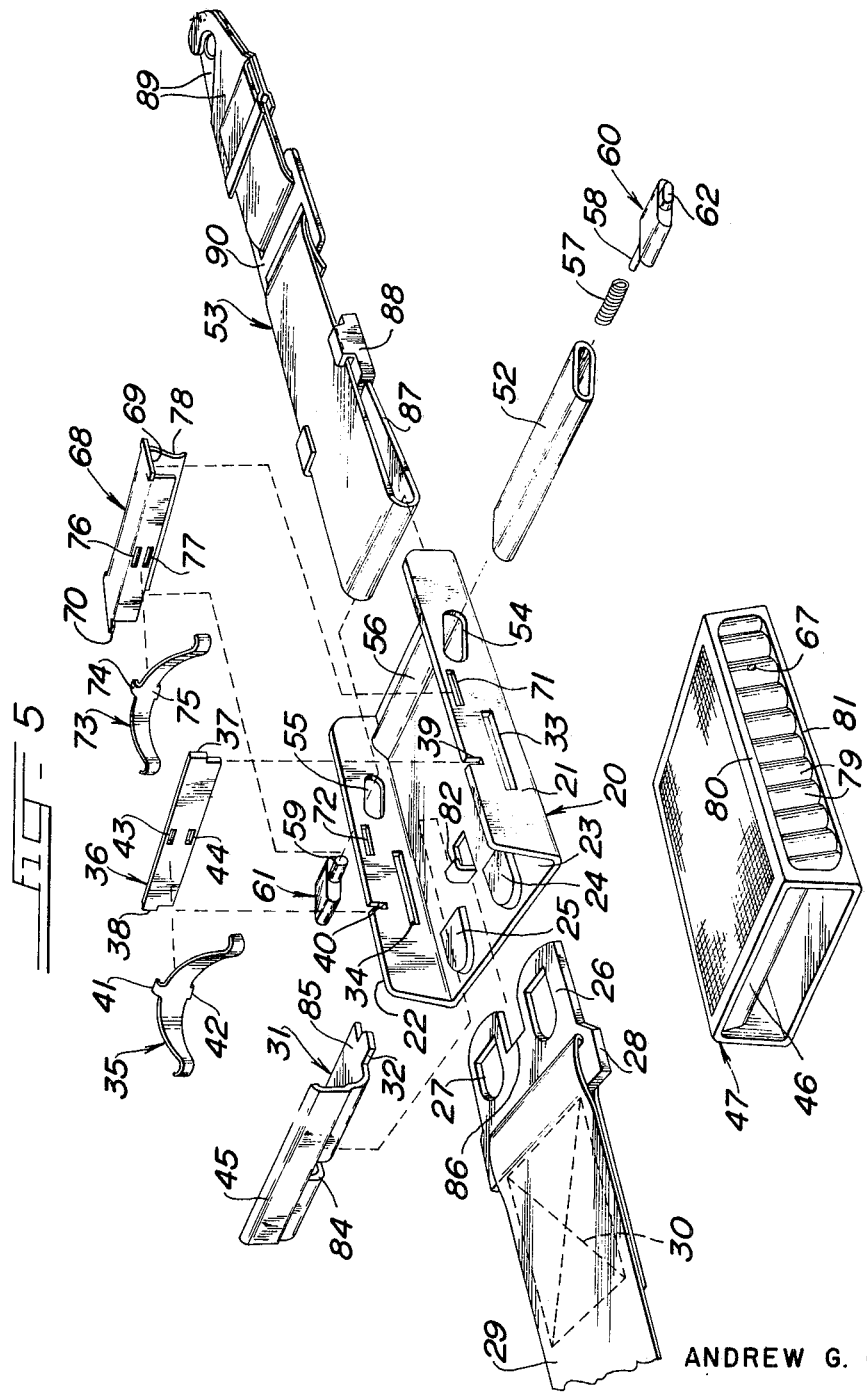

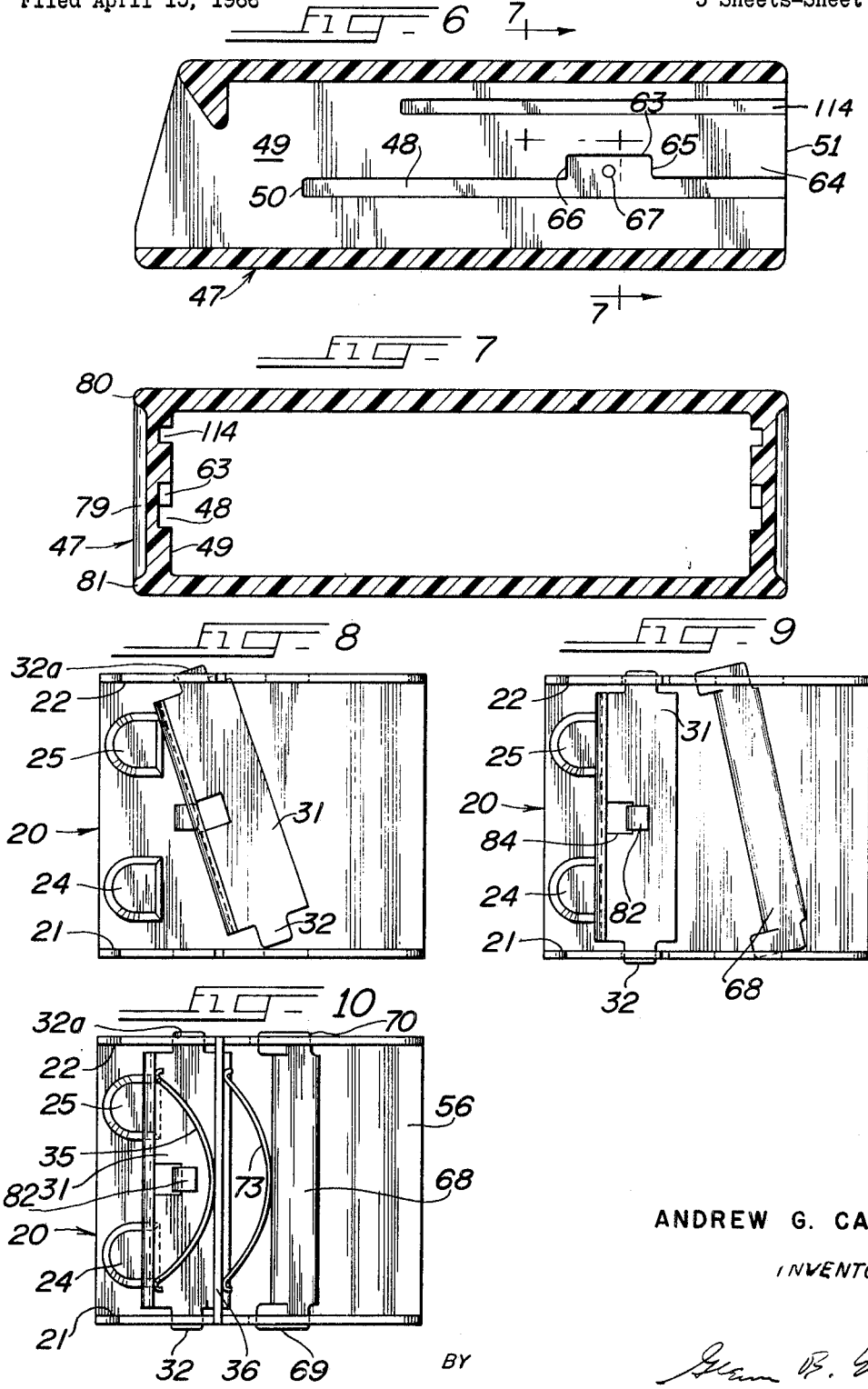

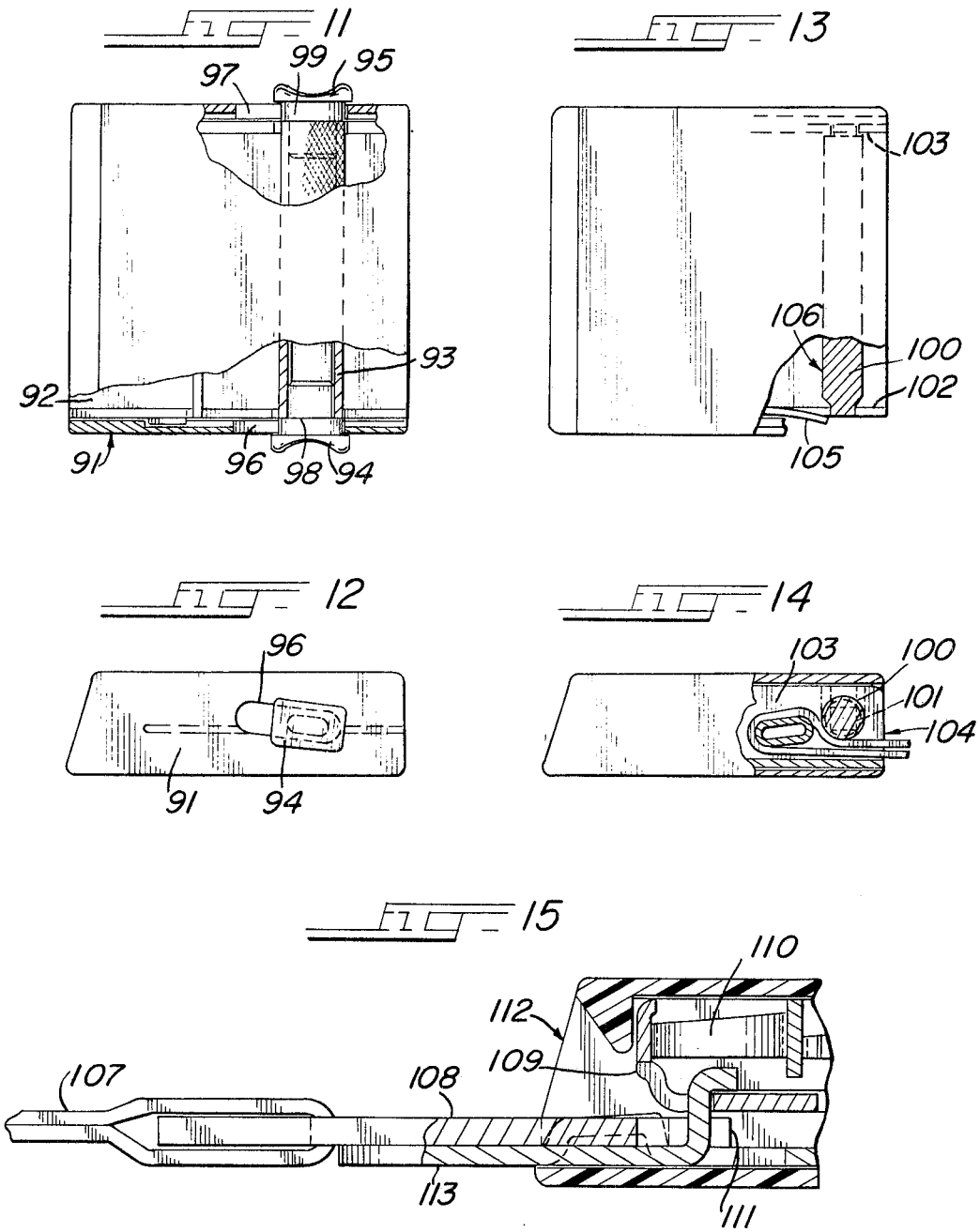

3,505,711
FULL-CONTROL SAFETY-BELT BUCKLE
Andrew G. Carter, 2930 Lake Drive SE.,
Grand Rapids, Mich. 49506
Filed Apr. 15, 1966, Ser. No. 542,813
Int. Cl. A44b 11/10, 11/25
U.S. Cl. 24—230                                    7 Claims

ABSTRACT OF THE DISCLOSURE

A safety-belt buckle with a slide-action handle receivable over a frame and mechanism in one of opposite directions of freedom of movement, with retractable securing means preventing withdrawal of the handle. One form of the invention utilizes opposite movement of the handle to effect unlocking and belt-release, respectively. The assembly of the mechanism is effected by placement of interior components, followed by a movement of the handle into position along the path of the locking-unlocking slide action, the components being insertable only in the absence of the handle.

---

This invention relates to the construction of safety-belts. It has been customary to provide these belts in two sections, which are coupled together and locked across the lap of the user. At least one of these sections must be adjustable as to length to accommodate different users and different seat positions. With few exceptions, the locking action and the length adjustment have been provided by different devices. The adjustment to correct length has been so inconvenient that the temptation is always present to simply leave excessive slack in the belt at all times, or not use the belt at all. The number of accidents involving series injury or fatality, and where safety belts were available *but not used*, is amazing. Any development that will decrease the inconvenience of a safety belt will materially reduce accident casualties, as the belts will only serve their proven advantage if they are used. Studies made by Cornell University, and by others since then, have proven by statistics that the correct use of a safety-belt will either prevent injury entirely, or substantially reduce the seriousness of it.

Much attention has been given to the design of secure and easily releasable coupling mechanism, but the adjustable connection of the belt to the buckle has not been adequately developed. The usual adjustable belt terminal involves a releasable clamping action on the belt material, with the clamping being generated as a jamming action on application of belt tension. Shortening of the belt is accomplished by simply pulling on the loose end. Lengthening, however, is another matter. All belt arrangements in current use (that are known to applicant) require a careful and often skilled manipulation to temporarily release the jamming action enough to permit extension. Some arrangements have been proposed for eliminating this problem, but these have been objectionable for excessive complexity, or have been clearly hazardous. Most arrangements require the use of both hands and full vision, and are particularly complicated when in conjunction with heavy clothing.

The present invention provides a belt assembly that is both releasable and adjustable as to length in response to the position of a single handle. The locking mechanism is of a type known as "slide action," and movement of the handle in a direction to separate the buckle sections releases the coupling lock. Movement of the handle in the opposite direction, the natural direciton of movement to pull extra length into the belt section, will release the belt terminal. Cessation of this pulling on the handle restores the ability of the terminal to develop its clamping action on receiving belt tension.

The preferred form of the invention utilizes a sliding handle that surrounds four sides of the buckle mechanism in the manner of a sleeve. The entire assembly has a neutrality to position which makes it without an "upside down" possibility. The envelopment of the device by the hand permits the user to pull the belt out and couple it with one continuous motion, and this is a tremendously important feature. Pulling the belt to correct tension requires a mere tug on the loose end of the belt after engagement of the buckle sections has been completed.

The mechanism provided by this inuvention contains some significant features that simplify manufacture and assembly. The components of the preferred form of the invention are interrelated in such a manner as to produce the sort of "bean bag" assembly, where, as the slang term implies, the parts are simply placed in assembly in sequence without special fastening. The last step secures the entirety. The several features of the invention will be analyzed in further detail through a discussion of the particular embodiments illustrated in the accompanying drawings. In the drawings:

FIGURE 1 is a perspective view showing coupled buckle sections interconnecting associated sections of a safety-belt.

FIGURE 2 is a sectional elevation on an enlarged scale of the preferred form of the invention, in the fully locked condition for transmission of belt tension.

FIGURE 3 illustrates the mechanism shown in FIGURE 2, but moved to the release position preparatory to uncoupling the buckle sections.

FIGURE 4 is a view of the mechanism shown in FIGURES 2 and 3, with the handle moved to the position for extension of the belt by release of the belt terminal.

FIGURE 5 is an exploded view showing the components of the mechanism illustrated in FIGURES 2, 3, and 4.

FIGURE 6 is a sectional elevation of the handle of the device.

FIGURE 7 is a section on the plane 7—7 of FIGURE 6.

FIGURES 8, 9, and 10 illustrate successive steps in the assembly of the mechanism illustrated in FIGURE 5.

FIGURE 11 is a partial section showing a modified form of the invention with regard to the interengagement of the handle and the belt terminal.

FIGURE 12 is an end elevation in projection with FIGURE 11.

FIGURE 13 is a partial section showing a further modification of the invention, associated with the fixed member of the adjustable belt terminal.

FIGUURE 14 is a partial sectional elevation, in projection with FIGURE 13.

FIGURE 15 is a modified form of the invention with regard to the locking mechanism.

FIGURE 16 is a plan view of a modified form of the invention, with the buckle sections disconnected.

FIGURE 17 is an axial section on an enlarged scale of the retaining detent used in the FIGURE 16 assembly.

The mechanism illustrated in FIGURES 1 through 5 includes a channel-shaped frame 20 providing the spaced parallel flanges 21 and 22 and the base 23. The deformed portions 24 and 25 in the base provide locking lugs which are engageable with the openings 26 and 27 in the plate 28, with the latter constituting the buckle section associated with the belt section 29. The connection of the belt section 29 to the plate 28 is nonadjustable, and is secured by the sewing generally indicated at 30.

When the buckle sections are interengaged as shown in FIGURE 1, a direct transfer of belt tension takes place at the interengagement of the openings 26 and 27 with the abutments 24 and 25. To maintain the plate 28 in close proximity to the base 23, and thus maintain the locking action, the slide member 31 is slidably mounted in the frame 20. The slide member is provided with the extensions 32 and 32a at the opposite ends, and these are slidably received within the slots 33 and 34 in the flanges 21 and 22, respectively. With the slide member in the FIGURE 2 position, it is obvious that the plate 28 cannot separate itself sufficiently from the base 23 to disengage the openings 26 and 27 from the abutments 24 and 25. Displacement of the slide member to the right, as shown in FIGURE 3, will permit the plate 28 to move upward and out of engagement with the abutments 24 and 25, thus releasing the locking action, and uncoupling the buckle sections. The slide member 31 is urged toward the locking position shown in FIGURE 2 by the action of the leaf spring 35 supported by the cross beam 36, which is located by the interengagement of the projections 37 and 38 at the opposite ends with the notches 39 and 40 in the flanges 21 and 22, respectively. The spring 35 is prevented from excessive displacement with respect to the bar 36 by the engagement of the ears 41 and 42 with the slots 43 and 44 in the beam. The ends of the spring 35 bear against the inside of the portion 45 of the slide member 31, and the unlocking of the device requires movement against the action of the spring 35 induced by the engagement of the ridge 46 of the sleeve-shaped handle 47. The inside of the ridge 46 bears against the outside of the portion 45 of the slide 31, as shown in FIGURE 3. Alternatively, or supplementing the engagement of the ridge 46 with the slide 31, is the fact that the projections 32 extend beyond the outer surfaces of the flanges 21 and 22 into engagement with the recesses 48 on the inside surfaces 49 of the slide handle 47. The end 50 of the recess 48 may, if desired, be disposed to engage the projections 32 at about the same time as the ridge 46 engages the portion 45 of the slide.

Since the assembly of the mechanism obviously requires that the handle 47 be axially slipped over the frame 20 from the left, as shown in FIGURES 2 through 5, it is obvious that the recesses 48 (which are in alignment with the projections 32 on the slide) must extend fully to the end 51 of the handle. The placement of the handle in position, however, represents the last step in the assembly of the device, which secures the remainder of the components in their relative operating positions. Prior to the engagement of the handle, the components constituting the adjustable belt terminal are installed. These include the tubular bar 52, which is somewhat flattened in cross section to provide substantial strength in bending against the action of tension applied from the belt section 53. The ends of the tubular bar 52 are received in the slots 54 and 55, which are preferably slightly inclined with respect to the plane of the base 23. The bar 52 is slidable in these slots with a limited freedom of movement, but with enough freedom to produce a jamming action on the belt which is entrapped between the bar and the raised portion 56 of the frame as shown in FIGURES 2 and 3. It is obvious that tension on the belt section 53 will tend to cause the bar 52 to move to the right, as shown in FIGURES 2 through 5, and the frictional interengagement between the bar and the deformed portion 56 of the frame will produce a jamming action which will resist the tension forces in the belt. Friction at this point may be supplemented by providing a knurled surface on the portion 56, and also on the rounded portion at the sides of the bar 52.

The hollow interior of the bar 52 provides space for the snap-in arrangement which secures the assembled relationship of the entire device. The spring 57 is received within the interior of the bar 52, and is located by being slipped over the ends 58 and 59 of the plugs 60 and 61. These plugs are also slidably received within the interior of the bar 52, and the end projections 62 are received in the offset portion 63 of the recess 48. Prior to slipping on the sleeve-shaped handle 47, the projections 62 will extend outward beyond the flanges 21 and 22 a sufficient amount to intercept the edge 51 of the handle 47. In order to complete the assembly of the handle, the plugs 60 and 61 must be depressed inwardly so that the projection 62 can pass over the interior surface of the handle in the area indicated at 64 in FIGURE 6. Once having been depressed to the point where they ride over the surface, continued movement of the handle to the right with respect to the frame 20 (as shown in FIGURES 2 through 5) will ultimately cause the projection 62 to drop into the recess 63. The projections will then be disposed between the shoulders 65 and 66, and the handle 47 will no longer be free to move back to the left to the point of disengaging itself from the mechanism. The presence of the sleeve handle will obviously maintain the bar 36 and its associated components in position, with the result that the buckle components remain in assembled relationship until a special tool is inserted at the openings 67, which are disposed opposite the ends 62, so that these may be pressed inwardly sufficiently to clear the side portions 64 of the handle to permit slipping the handle off to the left.

It is preferable to provide a gentle biasing action to generate a slight amount of pressure between the belt section 53 and the bar 52 to avoid a loosening action which might result from vibration, and also to inhibit a tendency for the shifting movement of the clothes of the user of the belt to accidentally displace the handle 47. It is obvious that movement of the handle to the left, as shown in FIGURE 4, will cause the projection 62 to engage the portions 65, and the handle will thus carry the bar 52 away from the portion 56. This movement eliminates the jamming action, and permits the belt section 53 to be extended. A biasing action towards the fully clamped position shown in FIGURES 1 and 2 is provided by the movable shoe 68, which has opposite end portions 69 and 70 received in the slots 71 and 72 of the frame flanges 21 and 22, respectively. The leaf spring 73 is located with respect to the shoe 68 by engagement of the ears 74 and 75 with the slots 76 and 77. The ends of the leaf spring 73 bear against the beam 36 to produce a tendency to move the shoe to the right, as shown in FIGURES 2 through 4. The portion 78 of the shoe bears against the belt section 53 as it turns around the side of the bar 52, and provides a gentle friction tending to prevent gradual slippage of the belt through vibration before belt tension can develop the jamming action. The action of the spring 73 will also inhibit an accidental displacement of the handle 47 to the left. Intentional manipulation of the handle by the hand is facilitated by the provision of the serrations 79, which preferably extend along the central portion of the handle, but terminate at the continuous ridges 80 and 81 at the opposite edges of the sides of the handle. The presence of the continuous ridges inhibits a possibility that the serrations might become interengaged with the clothing, particularly as the wearer might twist from one side to another during the course of manipulating the steering wheel of the vehicle. Since the buckle mechanism shown in FIGURES 2 through 4 is largely nonoriented, either side of it may be disposed against the body of the wearer. The capability of the mechanism to maintain its locking action in either position is increased by provision of the central lug 82 formed from the material of the base 23 of the frame, with the offset end 83 capable of entering the opening 84 in the slide member 31, and engaging the portion 85. This arrangement is shown in FIGURES 2 and 4, and inhibits any tendency of the slide member to bow upwardly and thus accidentally release the locking action. The central cutout 86 in the plate 28 provides clearance for the lug 82.

The nonoriented feature of the buckle mechanism is enhanced by securing the loose end 87 of the belt 53 to the slide grip 88, which embraces the belt section 53 so that muaual forces can be applied to the loose end 87 regardless of the orientation of the belt. A pull on the member 88 (to the right, as shown in FIGURE 5) will tend to tighten the belt to the correct condition around the wearer, preferably after the buckle sections have been interconnected. The belt section 53 will normally extend to some standard terminal fitting, and will be connected to it through an assembly such as the "sister hooks" 89 acting in conjunction with the plate 90.

The assembly of the device can be accomplished through the procedure suggested in FIGURES 8, 9, and 10. The length of the slots 33 and 34 is established in a relationship with respect to the dimensions of the ends 32 of the slide 31 such that the slide is insertable (in the absence of the spring 35 and the bar 36) in an inclined position, as shown in FIGURE 8. After this member has been inserted, the shoe 68 can be assembled in its slots in essentially the same manner. The bar 36 may then be installed, and the springs 35 and 73 may be appropriately engaged. The assembly of the bar 52 and its related components will complete the assembly of the interior mechanism, and the installation of the handle 47 as previously described will serve to maintain the relationship of the entire structure.

Referring to FIGURES 11 and 12, a modified form of the invention is shown which provides an alternative method of securing the handle 91 with respect to the frame 92. The movable terminal bar 93 is provided with plugs 94 and 95, which are slidably received in the recesses 96 and 97 in the handle 91, respectively. The plugs 94 and 95 are simply pressed into engagement with the ends of the tubular bar 93, to the limit defined by the shoulders 98 and 99. The presence of the plugs 94 and 95 in the slots 96 and 97 prevents movement of the handle to the left to the point of disengagement from the locking mechanism.

FIGURES 13 and 14 illustrate an alternative arrangement for the fixed abutment provided in the other views of the drawings by the offset portion 56 in the base of the frame. The bar 100 has square ends as shown at 101 in interengagement with similarly-formed openings in the side flanges 102 and 103 of the frame 104. A portion 105 is lanced out from the remainder of the flange 102 in the initial condition, which permits the bar 100 to be engaged at its opposite end, and then swung into position in the direction of the arrow 106. After the insertion of the bar 100, the portion 105 may be deformed into coplanar relationship with the remainder of the flange 102, thus confining the bar 100.

The modification shown in FIGURE 15 is associated with the frame of the mechanism, and is designed to inhibit a tendency for a downward component of tension in the belt section 107 to raise the opposite end of the plate 108 to the point where pressure from it against the underside of the slide lock 109 might interfere with the return movement of the lock to locking position shown in FIGURE 15. Such pressure might produce a force in excess of the capability of the spring 110 to move the slide against the friction involved. The upward movement of the portion 111 of the plate 108 is due to a rocking action about the left extremity of the frame 112, which acts as a fulcrum in cases where the curvature of the body of the wearer produces an angle of deviation between the lines of tension in the opposite belt sections. To reduce the moment tending to raise the right extremity 111 of the plate 108, a frame extension 113 is continued beyond the side flanges of the frame 112 so that the forces on the belt 107 will have a decreased tendency to force the portion 111 of the plate 108 upwardly. The effect of the extension 113 is to move the fulcrum near to the point of application of the forces from the belt 107, and thus decrease the forces at the opposite end of the lever represented by the plate 108. While this feature does sacrifice the non-oriented feature of the other modifications of the mechanism, there are some persons who attack sufficient value to the feature to more than offset this loss.

An optional feature in a mechanism including the shoe 68 is the provision (in the wall surfaces 49 of the handle) of clearance recesses as shown at 114 in FIGURES 6 and 7 opposite the ends 69 and 70 of the shoe. This arrangement permits greater length for these ends without interference, and reduces the need for excessively close tolerances.

The modification shown in FIGURES 16 and 17 can be used where it is unnecessary to include an adjustable belt terminal in the buckle mechanism. There would be no need for adjustability in the buckle mechanism where it was already provided by a lockable reel secured to the floor structure, or suspended in the belt. FIGURE 16 shows the buckle unit 115 with a portion of the handle 116 broken away to show the position of the retaining detent 117, which secures the buckle components in the same manner as the assembly associated with the hollow bar 52. The detent 117 has a tubular housing 118 and a fixed end plug 119. The spring 120 urges the moveable end plug 121 in a direction to increase the length of the device. The end extensions 122 and 123 engage the handle recess 63 to maintain the assembled condition of the mechanism as previously described. The detent 117 is installed by shoving the moveable end inward a sufficient amount for the unit to be received between the flanges 124 and 125 of the frame 126, after which the extensions 122 and 123 are engaged in suitable holes in the flanges. With the extensions projecting from the outside of the flanges as shown in FIGURE 16, and engaged in recesses 63, the buckle mechanism is maintained in the assembled condition.

FIGURE 16 also shows a special conformation of the components of the safety belt assembly at the points of junction of the belt-material with the metal components. The slots receiving the belt material are defined by arcuate edges as shown at 127 on the plate 128, at 129 on the frame 126, and at 130–133 on the loop-connector plate 134. These arcuate surfaces are formed to relieve the belt stresses near the edge of the belt, where stress concentration normally begins belt failure. The belt section 135 is looped through the slot 136 and sewn together at 137. The opposite belt section 138 is similarly worked through the slot 139, and sewn together at 140. The loop plate 134 is normally associated with a floor terminal.

The particular embodiments of the present invention which have been illustrated and discussed herein are for illustrative purpose only.

I claim:
1. A safety belt buckle, comprising:
   a coupling plate normally secured to a first belt section;
   a frame normally secured to a second belt section, and having a channel-shaped cross-section providing a base and spaced flanges extending from said base, and normally receiving said coupling plate between said flanges, said base and coupling plate having interengageable abutment and aperture-forming means;
   a slide member completely spaced from said base and having the opposite ends thereof slidably received in said flanges, respectively, for movement between a locking position holding said coupling plate adjacent to said base to maintain the engagement of said abutment and aperture-forming means, and to release position providing for disengagement thereof;
   a handle embracing said frame and slidably mounted thereon for movement parallel to said flanges, said handle having a portion engageable with said slide member to move the same to said release position; and
   an auxiliary securing member extending from said base and overlying a portion of said slide member exclusively in the locking position thereof to maintain a predetermined maximum spaced relationship between said base and the central portion of said slide member.

2. A buckle as defined in claim 1, wherein said slide member has said ends traversing slots in said flanges, respectively, said ends projecting beyond the outer surfaces of said flanges, and said handle having recesses on the inside surfaces thereof receiving said ends.

3. A buckle as defined in claim 2, wherein said slide member is engageable with said slots in the absence of said handle, with said slide member in an inclined position with respect to said flanges.

4. A safety belt buckle, comprising:
a coupling plate normally secured to a first belt section;
a frame normally secured to a second belt section, and having a channel-shaped cross section providing a base and spaced flanges extending from said base, and normally receiving said coupling plate between said flanges, said base and coupling plate having interengageable abutment and aperture-forming means;
a slide member having the opposite ends thereof slidably received in said flanges, respectively, for movement between a locking position holding said coupling plate adjacent to said base to maintain the engagement of said abutment and aperture-forming means, and a release position providing for disengagement thereof, said slide member being engageable with said flanges exclusively in the absence of said handle, and in a position inclined to a perpendicular to said flanges, and moveable on engagement with said flanges to a normal operating position perpendicular thereto;
a handle embracing and enclosing said frame and slidably mounted thereon for movement parallel to said flanges, said handle having a portion engageable with said slide member to move the same to said release position, said handle being adapted to engage said slide members from one direction, and to slip over said frame from said direction in the presence of said slide member and biasing means, said buckle also including retractable retaining means engageable with said handle in the assembled position thereof to prevent withdrawal of said handle from said frame; and biasing means urging said slide member to locking position.

5. A buckle as defined in claim 4, wherein said biasing means includes a beam received in slots in the edges of said flanges, and spring means extending between said beam and said slide member.

6. A buckle as defined in claim 4, wherein said handle has serrations on opposite sides thereof, said serrations terminating short of the edges of said sides.

7. A safety buckle, comprising:
a coupling member normally secured to a first belt section;
a frame having a channel-shaped configuration in cross section providing spaced parallel flanges;
belt-terminal means including components mounted on said frame for relative movement between clamping and release positions in engagement with a second belt section;
locking means mounted on said frame for releasably locking engagement with said coupling member, said locking means including interengageable abutment and aperture-forming means on said coupling member and frame, a slide member having the end portions thereof slidably engaging said flanges and movable between a locking position holding said coupling member adjacent to a portion of said frame in overlapping relationship to maintain the engagement of said abutment and aperture-forming means, and a release position providing clearance for separation of said abutment from said aperture-forming means, and also including a transverse bar having the ends thereof secured to said flanges, respectively, and spring means extending between said bar and said slide member to bias the latter to locking position; and
a handle slidably mounted on said frame for movement in opposite directions, said handle being operatively associated with said locking means to move the same to release position on movement of said handle in one of said directions, and with said belt-terminal means to move the same to release position on movement of said handle in the other of said directions.

References Cited
UNITED STATES PATENTS

| | | |
|---|---|---|
| 1,744,685 | 1/1930 | Nittel. |
| 3,317,243 | 5/1967 | Weman. |
| 2,999,288 | 9/1961 | Warner. |
| 3,131,446 | 5/1964 | Davis _____ 24—77 |
| 3,287,775 | 11/1966 | Eubank _____ 24—77 |

FOREIGN PATENTS

| | | |
|---|---|---|
| 1,202,550 | 10/1965 | Germany. |
| 892,209 | 3/1962 | Great Britain. |

BERNARD A. GELAK, Primary Examiner

U.S. Cl. X.R.

24—77, 196